(12) United States Patent
Ock

(10) Patent No.: US 12,524,290 B2
(45) Date of Patent: Jan. 13, 2026

(54) MEMORY SYSTEM, ELECTRONIC SYSTEM, AND OPERATING METHOD THEREOF

(71) Applicant: SK hynix Inc., Gyeonggi-do (KR)

(72) Inventor: Eun Jae Ock, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 28 days.

(21) Appl. No.: 18/454,789

(22) Filed: Aug. 24, 2023

(65) Prior Publication Data

US 2024/0303144 A1 Sep. 12, 2024

(30) Foreign Application Priority Data

Mar. 9, 2023 (KR) .................. 10-2023-0031221

(51) Int. Cl.
*G06F 11/00* (2006.01)
*G06F 11/07* (2006.01)

(52) U.S. Cl.
CPC .......... *G06F 11/076* (2013.01); *G06F 11/073* (2013.01)

(58) Field of Classification Search
CPC .. G06F 11/076; G06F 11/073; G06F 11/0793; G06F 11/0772; G06F 11/0775; G06F 11/0784; G06F 11/0787
See application file for complete search history.

(56) References Cited

U.S. PATENT DOCUMENTS

| | | | |
|---|---|---|---|
| 9,319,186 B1 * | 4/2016 | Chan | H04L 1/20 |
| 2006/0190642 A1 * | 8/2006 | Aldereguia | G06F 11/24 |
| | | | 710/60 |

FOREIGN PATENT DOCUMENTS

| | | | | |
|---|---|---|---|---|
| CN | 113728552 A | * | 11/2021 | ............... H03F 3/19 |
| KR | 10-2010-0061753 A | | 6/2010 | |
| KR | 10-2020-0067848 A | | 6/2020 | |
| KR | 10-2022-0019944 A | | 2/2022 | |

* cited by examiner

Primary Examiner — Katherine Lin
(74) Attorney, Agent, or Firm — IP & T GROUP LLP

(57) ABSTRACT

An electronic device includes a communication interface for, when a predetermined event occurs, transmitting a data signal generated based on data and a signal processing characteristic value to a memory system, and receiving eye diagram information corresponding to the data signal from the memory system; and a signal processing controller for controlling the signal processing characteristic value, based on an interval change value of the eye diagram information.

18 Claims, 9 Drawing Sheets

Table at top (Y0 / XV2):

| Y0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| XV2 | 0 | 0 | 6.5 | 6 | 6.5 | 6.5 | 7 | 7.5 | 7.5 | 7.5 | 7.5 | 7 | 7 | 7 | 0 | 0 |

Main matrix 50 (rows labeled top-to-bottom 14…1; columns "Offset" 1–16):

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 14 | -63 | -63 | -63 | -63 | -63 | -63 | -63 | -63 | -63 | -63 | -63 | -63 | -63 | -63 | -63 | -63 |
| 13 | -63 | -63 | -63 | -63 | -63 | -63 | 63 | 63 | 63 | -63 | -63 | -63 | -63 | -63 | -63 | -63 |
| 12 | -63 | -63 | -63 | -63 | -63 | 63 | 63 | 0 | 0 | 63 | 63 | -63 | -63 | -63 | -63 | -63 |
| 11 | -63 | -63 | -63 | -63 | 63 | 63 | 63 | 0 | 0 | 0 | 0 | 63 | -63 | -63 | -63 | -63 |
| 10 | -63 | -63 | 63 | 63 | 63 | 63 | 0 | 0 | 0 | 0 | 0 | 30 | 63 | -63 | -63 | -63 |
| 9 | -63 | -63 | 63 | 63 | 63 | 0 | 0 | 0 | 0 | 0 | 0 | 63 | 63 | -63 | -63 | -63 |
| 8 | -63 | -63 | 63 | 63 | 0 | 0 | 0 | 0 | 0 | 0 | 0 | 0 | 63 | -63 | -63 | -63 |
| 7 | -63 | -63 | 63 | 0 | 0 | 0 | 0 | 0 | 0 | 0 | 0 | 0 | 0 | 63 | -63 | -63 |
| 6 | -63 | -63 | 63 | 0 | 0 | 0 | 0 | 0 | 0 | 0 | 0 | 0 | 0 | 63 | 63 | -63 |
| 5 | -63 | -63 | 63 | 63 | 0 | 0 | 0 | 0 | 0 | 0 | 0 | 63 | 63 | -63 | -63 | -63 |
| 4 | -63 | -63 | 63 | 63 | 40 | 0 | 0 | 0 | 0 | 0 | 63 | 63 | -63 | -63 | -63 | -63 |
| 3 | -63 | -63 | -63 | -63 | 63 | 63 | 63 | 0 | 0 | 63 | 63 | 63 | -63 | -63 | -63 | -63 |
| 2 | -63 | -63 | -63 | -63 | -63 | -63 | -63 | 63 | 63 | -63 | -63 | -63 | -63 | -63 | -63 | -63 |
| 1 | -63 | -63 | -63 | -63 | -63 | -63 | -63 | -63 | -63 | -63 | -63 | -63 | -63 | -63 | -63 | -63 |

Right-side table (X0 / YV2):

| X0 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|
| YV2 | 0 | 0 | 8.5 | 9.5 | 9 | 9 | 9 | 8.5 | 8 | 8 | 8.5 | 8.5 | 0 | 0 |

MEMORY SYSTEM, ELECTRONIC SYSTEM, AND OPERATING METHOD THEREOF

CROSS-REFERENCE TO RELATED APPLICATION

The present application claims priority under 35 U.S.C. § 119 (a) to Korean patent application number 10-2023-0031221 filed on Mar. 9, 2023, the entire disclosure of which is incorporated by reference herein.

BACKGROUND

1. Technical Field

Embodiments of the present disclosure generally relate to an electronic device, and more particularly, to a memory system, an electronic system, and an operating method thereof.

2. Related Art

An electronic system may transmit/receive a signal through a channel. When a characteristic of the channel is changed, such as that the use time is lengthened, there may occur a concern in that noise occurs in a signal passing through the channel or in that information represented by an original signal is distorted due to loss of a signal. Accordingly, a technique is required, in which the electronic system autonomously detects a characteristic change in signal and transmits/receives a signal without distortion.

SUMMARY

Embodiments of the present disclosure provide a memory system, an electronic system, and an operating method thereof, capable of detecting a characteristic change in signal and transmit/receive a signal without distortion.

In accordance with an aspect of the present disclosure, there is provided a memory system including: a communication interface configured to receive a data signal from an electronic device, and adjust the data signal, based on a signal processing characteristic value; an eye diagram processor configured to acquire eye diagram information corresponding to the adjusted data signal; and a signal processing controller configured to control the signal processing characteristic value, based on an interval change value of the eye diagram information.

In accordance with another aspect of the present disclosure, there is provided an electronic system including: an electronic device including a first communication interface configured to output a data signal when a predetermined event occurs; and a memory system including a second communication interface configured to receive the data signal from the first communication interface and an eye diagram processor configured to acquire eye diagram information corresponding to the data signal, wherein one of the electronic device and the memory system further includes a signal processing controller configured to control a signal processing characteristic value based on an interval change value of the eye diagram information, and wherein one of the first and second communication interfaces is further configured to adjust the data signal based on the controlled signal processing characteristic value.

In accordance with still another aspect of the present disclosure, there is provided a method of operating a memory system, the method including: receiving a data signal from an electronic device; adjusting the data signal based on a signal processing characteristic value; acquiring eye diagram information, which corresponds to the adjusted data signal and includes error count values; acquiring a plurality of interval change values for respective intervals in each of which each of the error count values is equal to or less than a reference count value; acquiring, as an eye margin value, a sum of the interval change values; and controlling a signal processing characteristic value based on the eye margin value.

BRIEF DESCRIPTION OF THE DRAWINGS

Example embodiments of the present disclosure will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 4 is a diagram illustrating first eye diagram information in accordance with an embodiment of the present disclosure.

FIG. 5 is a diagram illustrating second eye diagram information in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
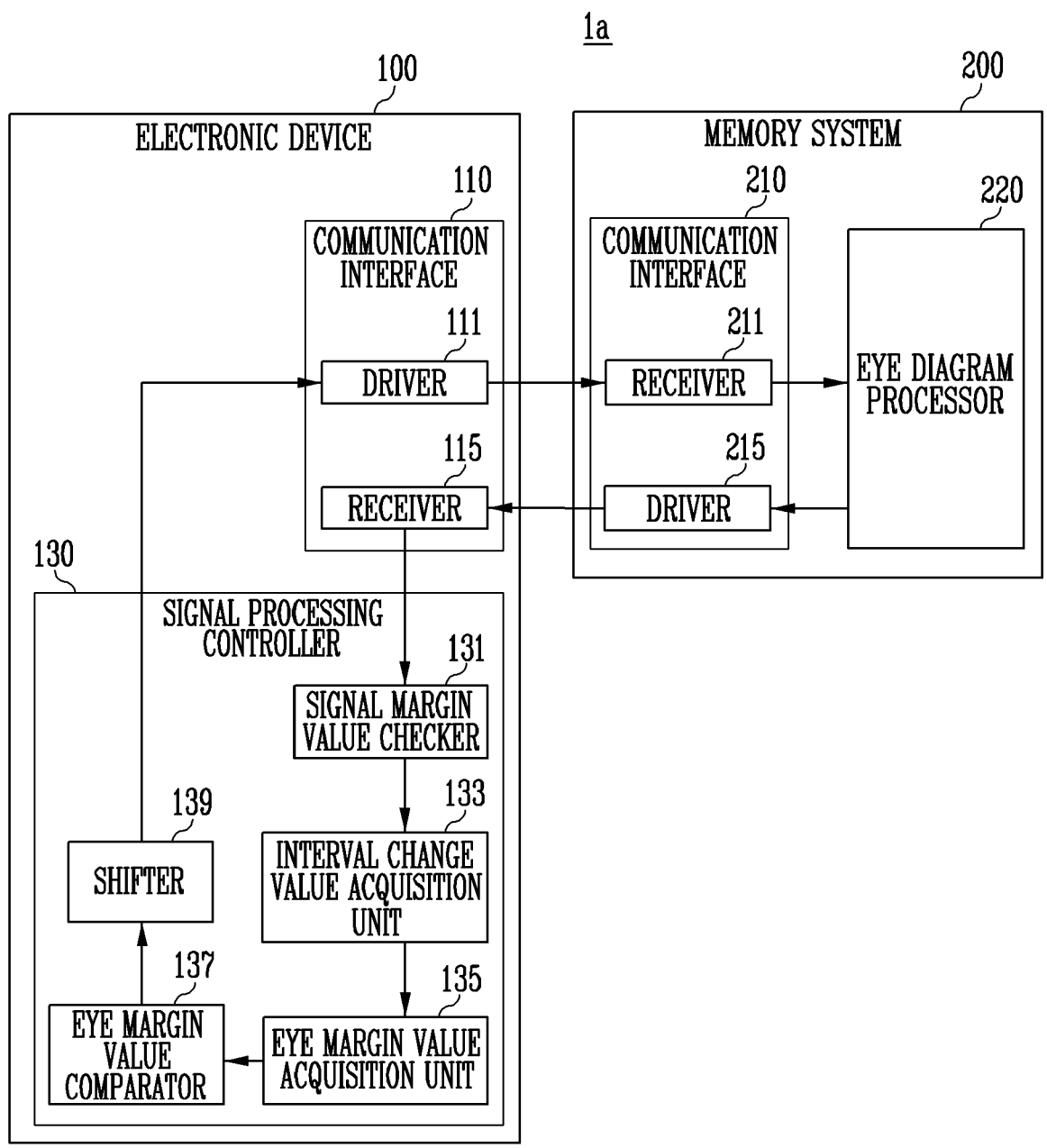
FIG. 1 is a diagram illustrating an electronic system in accordance with an embodiment of the present disclosure.

FIG. 1 is a diagram illustrating an electronic system 1a in accordance with an embodiment of the present disclosure.

Figure 2:
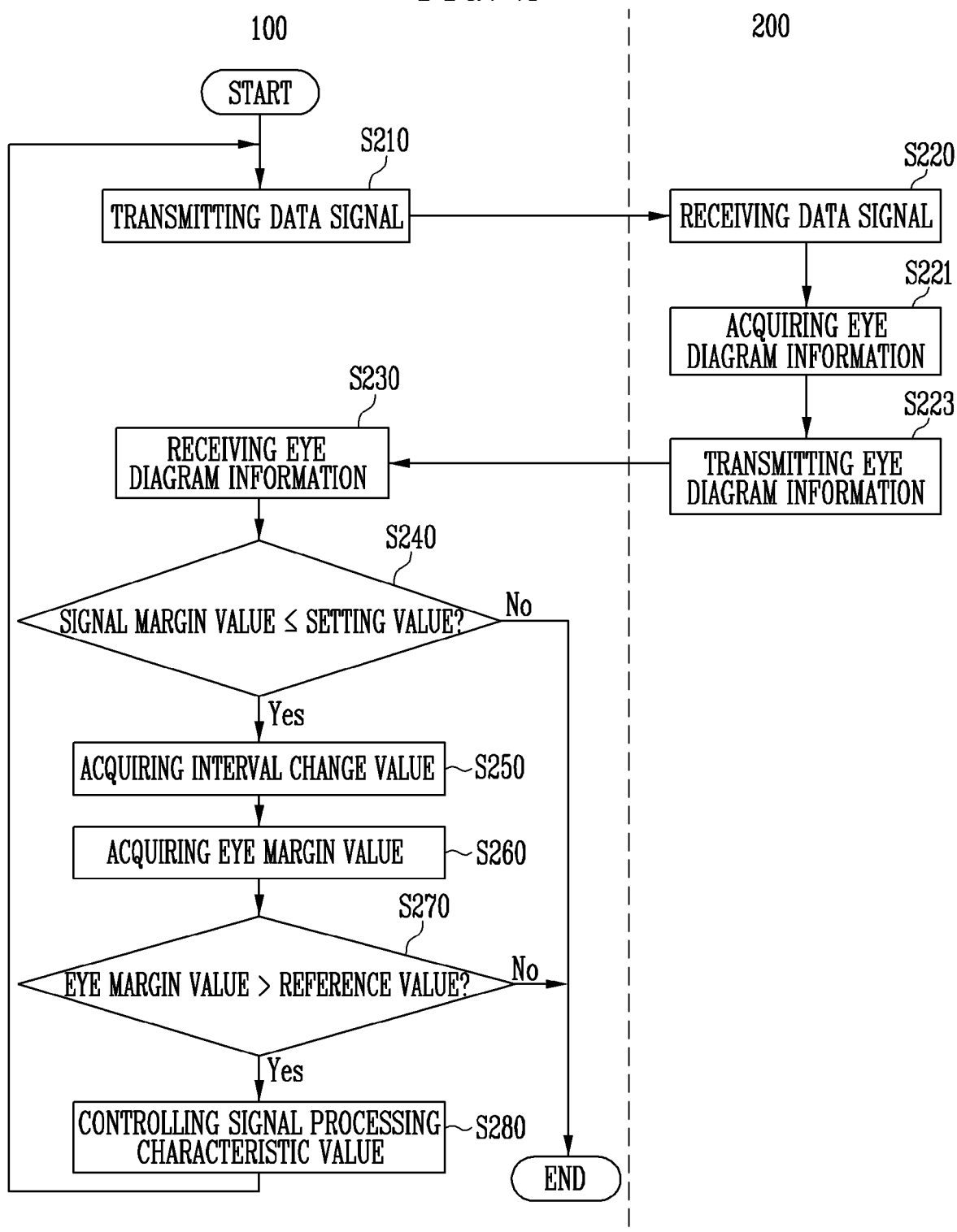
FIG. 2 is a flowchart for describing an operating method of the electronic system in accordance with an embodiment of the present disclosure.

FIG. 2 is a flowchart for describing an operating method of the electronic system 1a in accordance with an embodiment of the present disclosure.

Referring to FIG. 1, the electronic system 1a may include an electronic device 100 and a memory system 200. The memory system 200 may include at least one of a semiconductor memory device which stores data and a memory controller which controls the semiconductor memory device. The electronic device 100 may be one of various types of electronic devices including a mobile phone, a smart phone, an MP3 player, a laptop computer, a desktop computer, a game console, a TV, a tablet PC, an in-vehicle infotainment, and the like. However, this is merely an embodiment, and the electronic device 100 may mean all types of electronic devices having an authority for controlling the memory system 200. The memory system 200 may be implemented as an electronic device mounted inside the electronic device 100 or located at the outside of the electronic device 100.

In an embodiment, the electronic device 100 may include a communication interface 110 and a signal processing controller 130. The memory system 200 may include a communication interface 210 and an eye diagram processor 220.

The electronic device 100 and the memory system 200 may transmit/receive a signal through the communication interfaces 110 and 210. The communication interfaces 110 and 210 may perform communication, using at least one of various communication standards or interfaces, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The communication interface 110 of the electronic device 100 and the communication interface 210 of the memory system 210 may be connected to each other through a channel. The communication interfaces 110 and 210 may respectively include drivers 111 and 215 which output a signal and receivers 115 and 211 which receive a signal. For example, the signal may be a voltage having a waveform for representing one of 0 and 1. Each of the drivers 111 and 215 may include a digital-analog conversion circuit which converts data of a digital type into a data signal of an analog type and a transmitting equalizer which adjusts the waveform of a data signal according to a signal processing characteristic value. Each of the receivers 115 and 211 may include an analog-digital conversion circuit which converts a data signal of an analog type into data of a digital type.

Referring to FIGS. 1 and 2, when a predetermined event occurs, the communication interface of the electronic device 100 may transmit a data signal to the memory system 200 (S210). In an embodiment, the predetermined event may include an event for updating at least one of an operating system and firmware. In another embodiment, the predetermined event may include an event for receiving an approval command of a user. The approval command may be received through an input device such as a mouse, a keyboard or a microphone. In another embodiment, the predetermined event may include that a use time of the memory system 200 exceeds a reference time. For example, the reference time may be set as a time using, as a unit, a day, a month, a year, or the like. Meanwhile, the above-embodiments may be combined with each other.

In a specific embodiment, when the predetermined event occurs, the communication interface 110 of the electronic device 100 may generate a data signal, based on data and a signal processing characteristic value. In an embodiment, the signal processing characteristic value may correspond to one of an amplitude and a phase. For example, the data is a serial bit, and the data signal may be a voltage having a waveform corresponding to the signal processing characteristic value and the serial bit. Also, the communication interface 110 may output the data signal.

The communication interface 210 of the memory system 200 may receive the data signal from the electronic device 100 (S220). While the received data signal passes through the channel, loss or distortion may occur in the data signal due to degradation of the channel, or the like.

The eye diagram processor 220 of the memory system 200 may acquire eye diagram information corresponding to the received data signal (S221). The eye diagram information may include a plurality of error count values corresponding to each of an X axis and a Y axis, which are divided using a plurality of offsets. Each of the plurality of offsets may be an axis value. The error count value may represent the number of times loss or distortion of a signal corresponding to an X-axis offset and a Y-axis offset occur when the received data signal overlaps using a segment as a unit. In an embodiment, an absolute value of the error count value may represent the number of times loss or distortion of a signal corresponding to an X-axis offset and a Y-axis offset occur when the received data signal overlaps using a segment as a unit. The eye diagram processor 220 may transfer the eye diagram information to the communication interface 210, and control the communication interface 210 to transmit the eye diagram information to the electronic device 100. The communication interface 210 of the memory system 200 may transmit the eye diagram information to the electronic device 100 (S223).

The communication interface 110 of the electronic device 100 may receive the eye diagram information corresponding to the data signal from the memory system 200 (S230). The communication interface 110 may transfer the received eye diagram information to the signal processing controller 130.

The signal processing controller 130 may control the signal processing characteristic value, based on an interval change value of the eye diagram information.

In an embodiment, the signal processing controller 130 may include at least one of a signal margin value checker 131, an interval change value acquisition unit 133, an eye margin value acquisition unit 135, an eye margin value comparator 137, and a shifter 139.

When the eye diagram information is received (S230), the signal margin value checker 131 may compare a signal margin value acquired through the eye diagram information with a setting value (S240). The setting value may be a value pre-stored in the signal margin value checker 131. As the signal margin value becomes larger, the maximum magnitude of allowable noise may increase, and the quality of a signal may become better. For example, the signal margin value may be an interval value for a specific offset.

In an embodiment, the signal margin value checker 131 may acquire, for each of the offsets of the X axis, an interval value of a Y-axis interval in which each of the error count values is equal to or less than a reference count value, and acquire, for each of the offsets of the Y axis, an interval value of an X-axis interval in which each of the error count values is equal to or less than the reference count value. The interval value may represent a length of an interval having error count values each less than the reference count value (e.g., 1 or the like) or the center of the interval.

In an embodiment, the signal margin value checker 131 may acquire, as the signal margin value, a selected interval value among interval values of the Y-axis intervals for the respective offsets of the X-axis and interval values of the X-axis intervals for the respective offsets of the Y axis.

When the signal margin value is equal to or less than the setting value (S240, Yes), the signal margin value checker 131 may output a flag signal of a first state. When the signal margin value exceeds the setting value (S240, No), the signal margin value checker 131 may output a flag signal of a second state or end an operation without controlling the signal processing characteristic value. For example, the first state may be a high state and the second state may be a low state. Alternatively, the first state may be a low state and the second state may be a high state.

When the signal margin value is equal to or less than the setting value (S240, Yes), the interval change value acquisition unit 133 may acquire interval change values of the Y-axis intervals for the respective offsets of the X axis and the X-axis intervals for the respective offsets of the Y axis (S250). For example, when the state of the flag signal output from the signal margin value checker 131 is the first state, the interval change value acquisition unit 133 may acquire the interval change values of the Y-axis intervals for the respective offsets of the X axis and the X-axis intervals for the respective offsets of the Y axis.

In an embodiment, the interval change value acquisition unit 133 may acquire, as an internal change value, a difference between an interval value and an initial interval value of the Y-axis interval for a corresponding offset of the X axis based on the eye diagram information corresponding to the data signal and initial eye diagram information corresponding to an initial data signal. To this end, the interval change value acquisition unit 133 may store initial interval values of the Y-axis intervals for the respective offsets of the X axis and initial interval values of the X-axis intervals for the respective offsets of the Y axis. The initial interval values of the Y-axis intervals for the respective offsets of the X axis and the initial interval values of the X-axis intervals for the respective offsets of the Y axis may be acquired in advance, based on the initial eye diagram information corresponding to the initial data signal transmitted prior to the data signal.

In an embodiment, the interval value may be an average value of a minimum offset and a maximum offset among offsets included in an interval having error count values each less than the reference count value (e.g., 1 or the like). In another embodiment, the interval value may be a difference value of the maximum offset and the minimum offset among the offsets included in the interval. In another embodiment, the interval value may be an average value of the offsets included in the interval.

The eye margin value acquisition unit 135 may acquire, as an eye margin value, a sum of the interval change values of the Y-axis intervals for the respective offsets of the X axis and the X-axis intervals for the respective offsets of the Y axis (S260).

The eye margin value comparator 137 may determine whether the eye margin value exceeds a reference value (S270). The reference value may be a value pre-stored in the eye margin value comparator 137. In an embodiment, when the eye margin value exceeds the reference value (S270, Yes), the eye margin value comparator 137 may output a flag signal of a first state. When the eye margin value is equal to or less than the reference value (S270, No), the eye margin value comparator 137 may output a flag signal of a second state. For example, the first state may be a high state and the second state may be a low state. Alternatively, the first state may be a low state and the second state may be a high state. For example, when the state of the flag signal output from the eye margin value comparator 137 is the second state, the shifter 139 may end the operation without controlling the signal processing characteristic value.

In an embodiment, when the eye margin value exceeds the reference value (S270, Yes), the shifter 139 may control the signal processing characteristic value (S280). For example, when the state of the flag signal output from the eye margin value comparator 137 is the first state, the shifter 139 may control the signal processing characteristic value. The shifter 139 may control the communication interface 110 to transmit, to the memory system 200, a new data signal generated based on the data and the controlled signal processing characteristic value. The communication interface 110 may receive new eye diagram information on the new data signal from the memory system 200. The signal processing controller 130 may compare a new signal margin value acquired through the new eye diagram information with the setting value (S240), and repeatedly perform the operation according to a flow until the new signal margin value exceeds the setting value within a predetermined maximum number limit.

In an embodiment, the shifter 139 may store mode information. The mode information may represent a mode set to one of a first mode and a second mode. According to the set mode, the shifter 139 may differently apply a maximum number with which the new data signal is transmitted to the memory system 200 after the data signal is transmitted. The first mode may be a simple mode and the second mode may be a precise mode. For example, when the mode information is set to the simple mode, the shifter 139 may apply the maximum number of 4 with which the new data signal is transmitted to the memory system 200. For example, when the mode information is set to the precise mode, the shifter 139 may apply the maximum number of 8 with which the new data signal is transmitted to the memory system 200. The maximum number set in the precise mode may be greater than the maximum number set in the simple mode.

Figure 3:
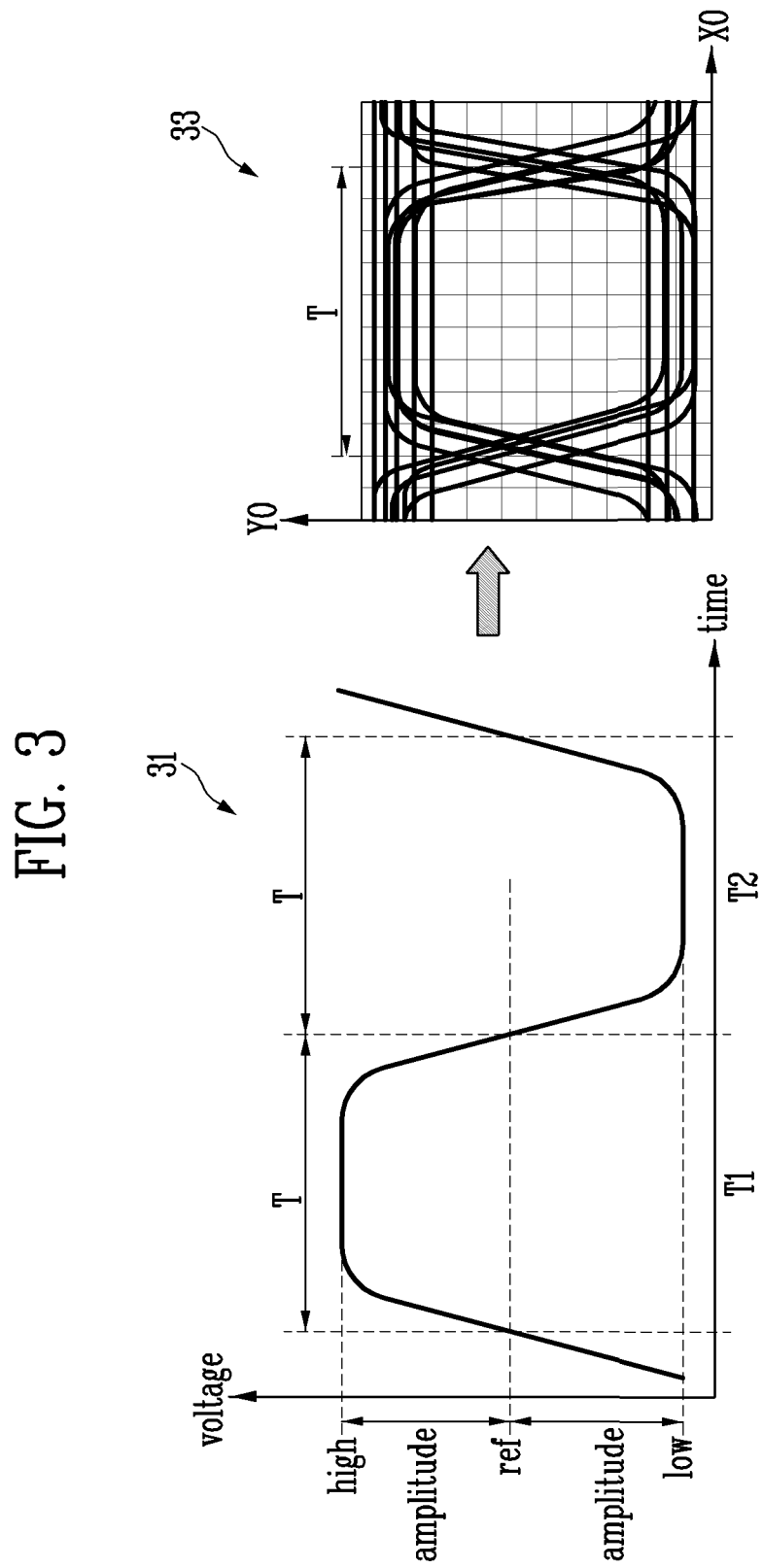
FIG. 3 is a diagram illustrating a data signal and an eye diagram in accordance with an embodiment of the present disclosure.

FIG. 3 is a diagram illustrating a data signal and an eye diagram in accordance with an embodiment of the present disclosure.

Referring to FIGS. 1 and 3, the communication interface 210 in accordance with an embodiment of the present disclosure may receive a data signal 31 from the electronic device 100. The data signal 31 may represent a serial bit. A voltage of the data signal 31 may swing from a reference level to a high level or a low level during a clock cycle T according to an amplitude and the serial bit. The high level may represent a first value (e.g., 1) of the bit, and the low level may represent a second value (e.g., 0) of the bit.

The eye diagram processor 220 may acquire an eye diagram 33 corresponding to the data signal 31. For example, the eye diagram processor 220 may overlap a plurality of segments T1 and T2 by using the clock cycle T as a unit on a plane divided into an offset XO of the X axis and an offset YO of the Y axis, thereby acquiring the eye diagram 33. The offset XO of the X axis may represent time, and the offset YO of the Y axis may represent voltage. The offset XO of the X axis may correspond to a scale unit smaller than the clock cycle T, and the offset YO of the Y axis may correspond to a scale unit smaller than the amplitude. The offset XO of the X axis may be transformed to a phase.

In an embodiment, the eye diagram processor 220 may extract an error count value corresponding to the offset XO of the X axis and the offset YO of the Y axis in the eye diagram 33, thereby acquiring eye diagram information. The eye diagram information may include a plurality of error count values. For example, the error count value corresponding to the offset XO of the X axis and the offset YO of the Y axis may represent a number of voltages determined to be distorted by comparing the voltage corresponding to the offset YO of the Y axis with a voltage of the signal before distortion at a time corresponding to the offset XO of the X axis.

Figure 4:
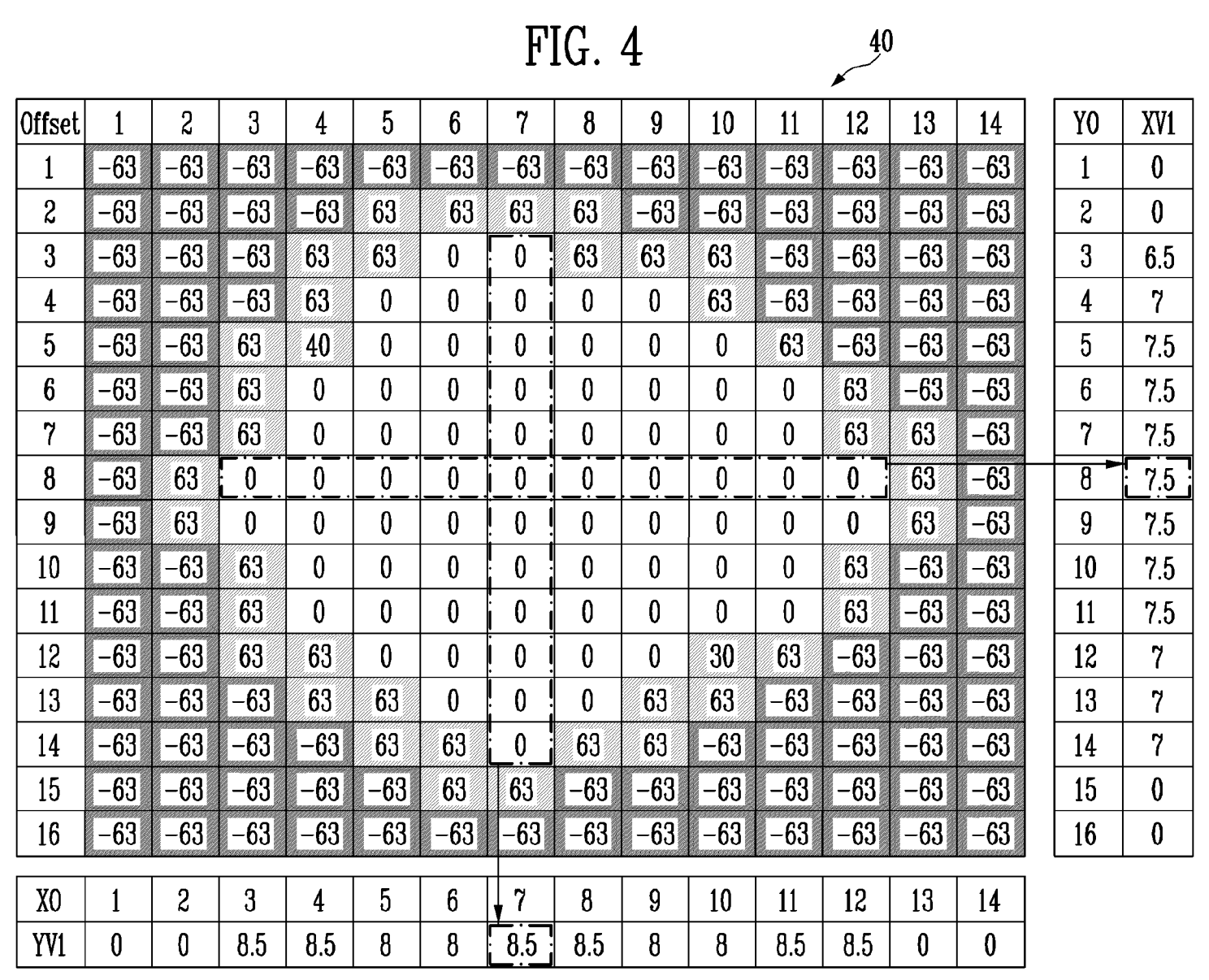

FIG. 4 is a diagram illustrating first eye diagram information in accordance with an embodiment of the present disclosure.

Referring to FIGS. 1 and 4, the first eye diagram information 40 may include a plurality of error count values corresponding to each offsets of the X axis and offsets of the Y axis. In FIGS. 1 and 4 the first eye diagram information 40 is initial eye diagram information acquired in manufacturing of the electronic system 1a or in a use initial stage.

The eye diagram processor 220 of the memory system 200 may acquire the first eye diagram information 40 corresponding to an initial data signal received through the communication interface 210. The communication interface 210 of the memory system 200 may transmit the first eye diagram information 40 to the electronic device 100.

The signal margin value checker 131 may acquire an initial interval value YV1 of a Y-axis internal for each offset XO of the X axis and an initial interval value XV1 of an X-axis interval for each offset YO of the Y axis.

In an embodiment, each of the Y-axis interval and the X-axis interval may have error count values each less than a reference count value (e.g., 1 or the like). For example, the Y-axis interval corresponding to the offset XO having a value of 7 on the X axis may include the offsets YOs having values 3 to 14 and may have the error count values each of 0 on the Y-axis. The X-axis interval corresponding to the offset YO having a value of 8 on the Y axis may include the offsets XOs having values 3 to 12 and may have the error count values each of 0 on the X-axis.

In an embodiment, the signal margin value checker 131 may acquire, as the initial interval value YV1 or XV1 for each offset of the X axis or Y axis, an average value of a minimum offset and a maximum offset among the offsets included in the Y-axis interval or the X-axis interval for each offset of the X axis or Y axis. For example, the Y-axis interval corresponding to the offset XO having a value of 7 on the X axis may include the offsets YOs having values 3 to 14 having the error count value of 0. The signal margin value checker 131 may determine, as the initial interval value YV1, 8.5 as an average value of 3 as a minimum offset included in the Y-axis interval and 14 as a maximum offset included in the Y-axis interval. In another example, the X-axis interval corresponding to the offset YO having a value of 8 on the Y axis may include the offsets XOs having values 3 to 12 having the error count value of 0. The signal margin value checker 131 may determine, as the initial interval value XV1, 7.5 as an average value of 3 as a minimum offset included in the X-axis interval and 12 as a maximum offset included in the X-axis interval. In this manner, the signal margin value checker 131 may acquire the initial interval value YV1 of the Y-axis interval for each offset XO of the X axis and the initial interval value XV1 of the X-axis interval for each offset YO of the Y axis.

In an embodiment, the signal margin value checker 131 may acquire, as the interval value YV1 or XV1, a difference value of the maximum offset and the minimum offset among the offsets included in the Y-axis interval or the X-axis interval. For example, the signal margin value checker 131 may determine, as the initial interval value YV1, 11 as a difference value of 3 as the minimum offset and 14 as the maximum offset, which are included in the Y-axis interval corresponding to the offset XO having a value of 7 on the X axis. In another example, the signal margin value checker 131 may determine, as the initial interval value XV1, 9 as a difference value of 3 as the minimum offset and 12 as the maximum offset, which are included in the X-axis interval corresponding to the offset YO having a value of 8 on the Y axis. In this manner, the signal margin value checker 131 may acquire the initial interval value YV1 of the Y-axis interval for each offset XO of the X axis and the initial interval value of the X-axis interval for each offset YO of the Y axis.

In an embodiment, the signal margin value checker 131 and the interval change value acquisition unit 133 may store the initial interval value YV1 of the Y-axis interval for each offset XO of the X axis and the initial interval value XV1 of the X-axis interval for each offset YO of the Y axis.

A case where the initial interval values YV1 and XV1 of the Y-axis intervals for the respective offsets of the X axis and the X-axis intervals for the respective offsets of the Y axis are acquired by the signal margin value checker 131 has been described, this is merely an embodiment, and a case where the initial interval values YV1 and XV1 of the Y-axis intervals for the respective offsets of the X axis and the X-axis intervals for the respective offsets of the Y axis are acquired by the eye diagram processor 220 may be modified and embodied. The first eye diagram information 40 may include the interval value YV1 of the Y-axis interval for each offset XO of the X axis and the interval value XV1 of the X-axis interval for each offset YO of the Y axis.

In an embodiment, when an initial data signal is received through the communication interface 210, the eye diagram processor 220 may acquire a plurality of initial eye diagram information in which scale units of the offsets XO and YO of the X axis and the Y-axis are different from each other. For example, the scale unit of the offsets XO and YO of the X axis and the Y-axis is 1 in first initial eye diagram information, the scale unit of the offsets XO and YO of the X axis and the Y-axis is 2 in second initial eye diagram information, and the scale unit of the offsets XO and YO of the X axis and the Y-axis is 4 in second initial eye diagram information. As the scale unit becomes larger, the interval of offsets may become larger, and the number of offsets may become smaller. That the number of offsets is small may mean that an operation amount required to acquire the eye diagram information becomes small. For example, when the scale unit is 1, the interval between 1 and 2 as offsets XO of the X axis may be 50 ps. When the scale unit is 4, the interval between 1 and 2 as the offsets XO of the X axis may be 200 ps.

FIG. 5 is a diagram illustrating second eye diagram information in accordance with an embodiment of the present disclosure.

Referring to FIGS. 1 and 5, the second eye diagram information 50 may include a plurality of error count values corresponding to each offsets of the X axis and offsets of the Y axis. The second eye diagram information 50 may be eye diagram information acquired after a certain time elapses as the use time of the electronic system 1a.

When a predetermined event occurs, the communication interface 110 of the electronic device 100 may transmit a data signal to the memory system 200. The communication interface 210 of the memory system 200 may receive the data signal.

The eye diagram processor 220 of the memory system 200 may acquire the second eye diagram information 50 corresponding to the received data signal. The communication interface 210 may transmit the second eye diagram information 50 to the electronic device 100. While the received data signal passes through the channel, loss or distortion may occur in the data signal due to degradation of the channel, or the like. An interval value YV2 or XY2 of a Y-axis interval for each offset XO of the X axis or an X-axis interval for each offset YO of the Y axis of the second eye diagram information 50 may be changed as compared with the first eye diagram information.

In an embodiment, the signal margin value checker 131 of the electronic device 100 may acquire an interval value YV2 of the Y-axis interval for each offset XO of the X axis and an interval value XV2 of the X-axis interval for each offset YO of the Y axis, based on the plurality of error count values included in the second eye diagram information 50. A method of acquiring the interval values YV2 and XV2 overlaps with that described in FIG. 4, and therefore, its description will be omitted.

In an embodiment, the signal margin value checker 131 may acquire, as a signal margin value, a selected interval value among the interval values YV2 and XV2 for the respective offsets of the X axis and the respective offsets of the Y axis. Also, the signal margin value checker 131 may compare the signal margin value with a setting value. In an embodiment, the selected interval value may be selected for the offset having a median value among the plurality of offsets. For example, the selected interval value may be selected for the offset XO having a value of 7 on the X axis and the offset YO having a value of 8 on the Y axis. However, this is merely an embodiment, and the selected interval value may be selected in various manners.

In an embodiment, when the data signal is received, the eye diagram processor 220 may adjust a number of the plurality of offsets, based on at least one of a use time of the memory system 200 and a number of times an abnormal voltage is generated.

Specifically, the eye diagram processor 220 may select one of a plurality of predetermined scale units, based on at least one of the use time of the memory system 200 and the number of times an abnormal voltage is generated. For example, the eye diagram processor 220 may calculate a score according to the use time and the number of times an abnormal voltage is generated, and select a lower scale unit as the score becomes higher. The use time may be calculated as a percentage in proportion to the capacity of data accumulated and stored in the memory system 200, and the score may increase by 1 per 10%. The number of times an abnormal voltage is generated may be counted once when an operating voltage becomes lower than a reference voltage, and the score may increase by 1 per 100 times. For example, when the score is 30 or less, scale unit 4 may be selected. When the score exceeds 30 and is 50 or less, scale unit 2 is selected. When the score exceeds 50, scale unit 1 may be selected. In another embodiment, when the data signal is received, the eye diagram processor 220 may select one of the plurality of predetermined scale units according to a setting selected by a user.

The eye diagram processor 220 may acquire the second eye diagram information 50 corresponding to the received data signal according to the selected scale unit. Specifically, the eye diagram processor 220 may check an error count value for each of a plurality of offset coordinates divided using the scale unit. For example, when the scale unit of each of the X axis and the Y axis is 1, an offset increases by 1 as the scale unit from 1 to 100 on an offset coordinate of each of the X axis and the Y axis. Therefore, the number of offsets of each of the X axis and the Y axis may be 100, and the number of times the error count value is checked may be 10000. In another example, when the scale unit of each of the X axis and the Y axis is 4, an offset increases by 4 as the scale unit from 0 to 100 on an offset coordinate of each of the X axis and the Y axis. Therefore, the number of offsets of each of the X axis and the Y axis may be 25, and the number of times the error count value is checked may be 625. That is, as the scale unit increases, the number of offsets and the number of times the error count value is checked may decrease.

Meanwhile, when an internal change value is calculated, the interval change value acquisition unit 133 may select an initial interval value of the first eye diagram information having the same scale unit as the second eye diagram information 50.

Figure 6:
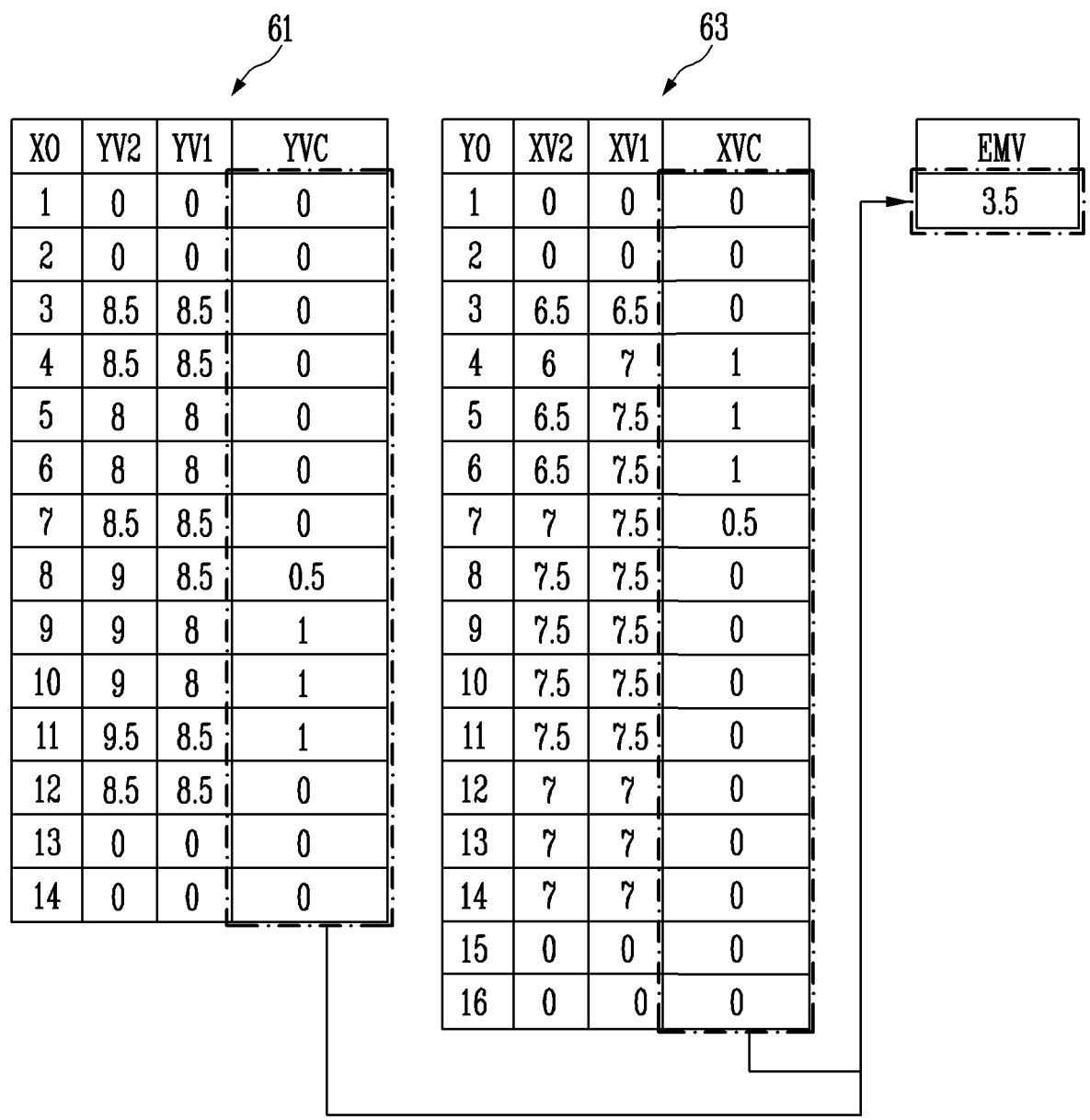
FIG. 6 is a diagram illustrating an eye margin value in accordance with an embodiment of the present disclosure.

FIG. 6 is a diagram illustrating an eye margin value in accordance with an embodiment of the present disclosure.

Referring to FIGS. 1 and 6, the interval change value acquisition unit 133 may acquire, as an interval change value YVC, a difference between the interval value YV2 and the initial interval value YV1 of the Y-axis interval for a corresponding offset of the X axis. The interval change value acquisition unit 133 may acquire, as an interval change value XVC, a difference between the interval value XV2 and the initial interval value XV1 of the X-axis interval for a corresponding offset of the Y axis. For example, the interval change value acquisition unit 133 may acquire, as an interval change value YVC of the Y-axis interval for the offset XO having a value of 9 on the X axis, a difference value (e.g., 1) of 9 as an interval value YV2 and 8 as an initial interval value YV1. In this manner, the interval change value acquisition unit 133 may acquire each of the interval change values YVC and XVC.

The eye margin value acquisition unit 135 may acquire, as an eye margin value EMV, a value (e.g., 3.5) obtained by adding up the interval change values YVC and XVC. The eye margin value acquisition unit 135 may output the eye margin value EMV to the eye margin value comparator 137. The eye margin value comparator 137 may determine whether the eye margin value EMV exceeds a reference value. For example, the reference value may be predetermined as 3 or the like to be stored in the eye margin value comparator 137. When the eye margin value EMV exceeds the reference value, the shifter 139 may control a signal processing characteristic value, and control the communication interface 110 to transmit, to the memory system 200, a new data signal generated based on data and the controlled signal processing characteristic value.

Figure 7:
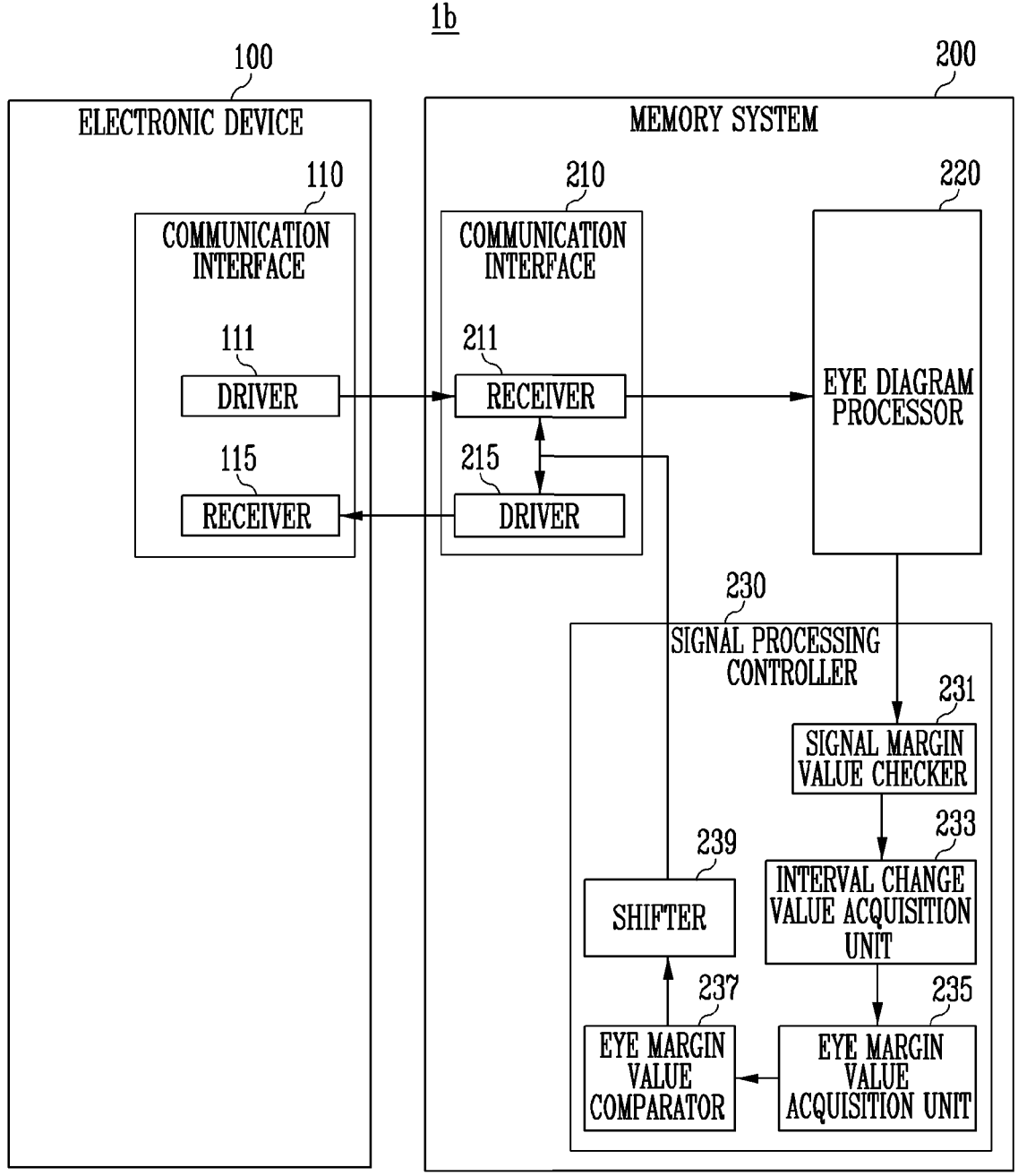
FIG. 7 is a diagram illustrating an electronic system in accordance with another embodiment of the present disclosure.
Figure 8:
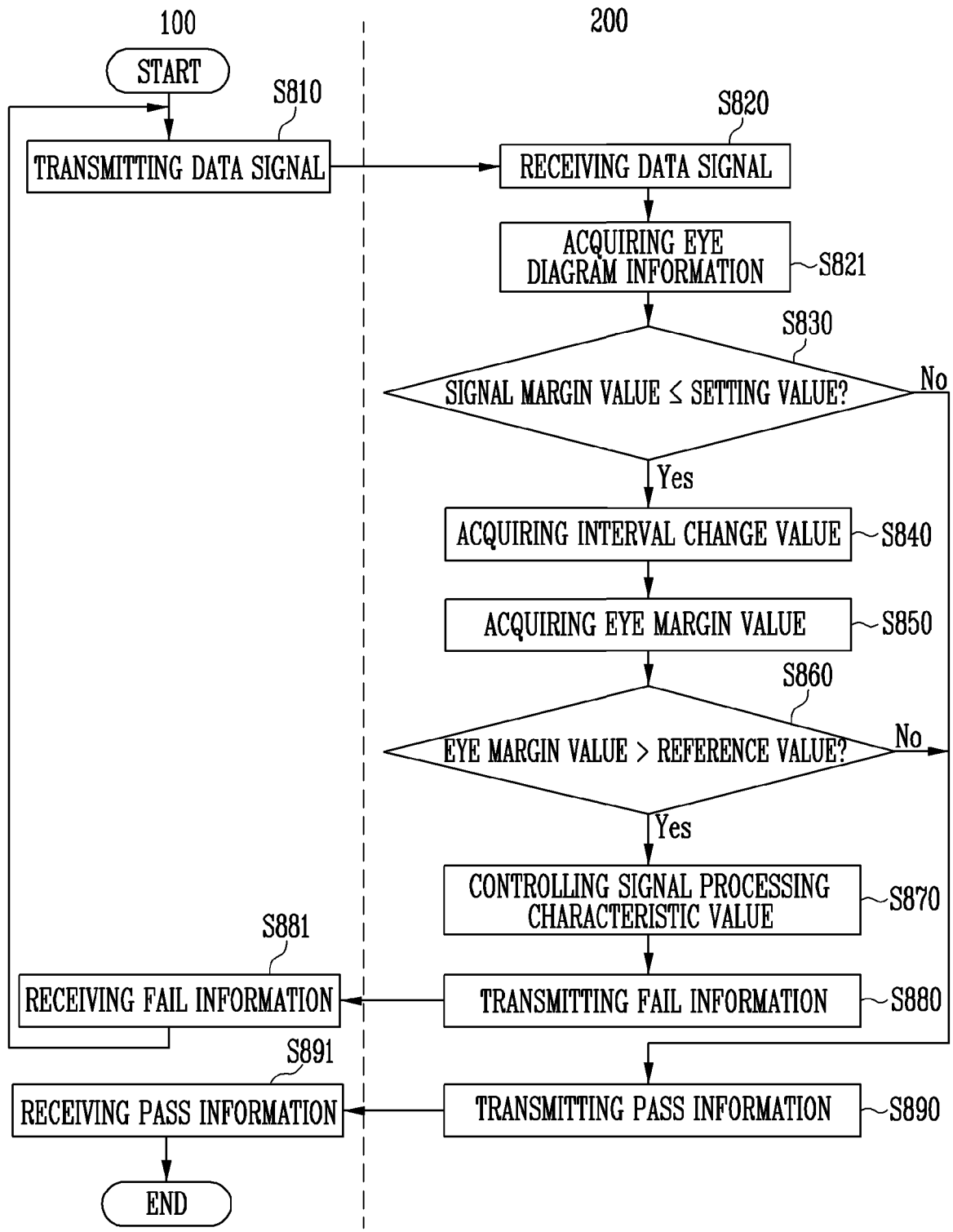
FIG. 8 is a flowchart for describing an operating method of the electronic system in accordance with an embodiment of the present disclosure.

FIG. 7 is a diagram illustrating an electronic system 1*b* in accordance with another embodiment of the present disclosure. FIG. 8 is a flowchart for describing an operating method of the electronic system 1*b* in accordance with an embodiment of the present disclosure.

Referring to FIG. 7, the electronic system 1*b* may include an electronic device 100 and a memory system 200. The descriptions illustrated in FIG. 1 may be applied to those for each of the electronic device 100 and the memory system 200, and overlapping descriptions will be omitted.

The electronic device 100 may include a communication interface 110. The memory system 200 may include a communication interface 210, an eye diagram processor 220, and a signal processing controller 230. In an embodiment, the descriptions of the signal processing controller 130 illustrated in FIG. 1 may be applied to those of the signal processing controller 230, and overlapping descriptions will be omitted.

The communication interfaces 110 and 210 may respectively include drivers 111 and 215 which output a signal and receivers 115 and 211 which receive a signal. Each of the drivers 111 and 215 may include a digital-analog conversion circuit which converts data of a digital type into a data signal of an analog type. Each of the receivers 115 and 211 may include a receiving equalizer which adjusts the waveform of a data signal according to a signal processing characteristic value and an analog-digital conversion circuit which converts a data signal of an analog type into data of a digital type.

Referring to FIGS. 7 and 8, when a predetermined event occurs, the communication interface 110 of the electronic device 100 may generate a data signal corresponding to data and transmit the generated data signal to the memory system 200 (S810). For example, the data may be a serial bit, and the data signal may be a voltage having a waveform corresponding to the serial bit.

The communication interface 210 of the memory system 200 may receive the data signal from the electronic device 200 (S820). The communication interface 210 may adjust the data signal, based on a signal processing characteristic value. In an embodiment, the signal processing characteristic value may be a value for adjusting an amplitude, a phase, or the like.

The eye diagram processor 220 of the memory system 200 may acquire eye diagram information corresponding to the data signal adjusted by the communication interface 210 (S821). In an embodiment, the eye diagram information may include a plurality of error count values corresponding to each of the X axis and the Y axis, which are divided using a plurality of offsets. In an embodiment, the eye diagram processor 220 may adjust a number of the plurality of offsets, based on at least one of a use time of the memory system 200 and a number of times an abnormal voltage is generated.

The signal processing controller 230 of the memory system 200 may control the signal processing characteristic value, based on an interval change value of the eye diagram information.

In a specific embodiment, the signal processing controller 230 may include at least one of a signal margin value checker 231, an interval change value acquisition unit 233, an eye margin value acquisition unit 235, an eye margin value comparator 237, and a shifter 239.

The signal margin value checker 231 may determine whether a signal margin value of the eye diagram information is equal to or less than a setting value (S830). In a specific embodiment, the signal margin value checker 231 may acquire, for each of the offsets of the X axis, an interval value of a Y-axis interval in which each of the error count values is equal to or less than a reference count value, and acquire, for each of the offsets of the Y axis, an interval value of an X-axis interval in which each of the error count values is equal to or less than the reference count value. The signal margin value checker 231 may acquire, as the signal margin value, a selected interval value among the interval values of the Y-axis intervals for the respective offsets of the X axis and the interval values of the X-axis intervals for the respective offsets of the Y axis. When the signal margin value exceeds the setting value (S830, No), the signal margin value checker 231 may control the communication interface 220 to transmit pass information to the electronic device 100. The communication interface 220 may transmit the pass information to the electronic device 100 under the control of the signal margin value checker 231. When the electronic device 100 receives the pass information (S891), the electronic device 100 may end an operation without controlling the signal processing characteristic value.

When the signal margin value is equal to or less than the setting value (S830, Yes), the interval change value acquisition unit 233 may acquire interval change values of the Y-axis intervals for the respective offsets of the X axis and the X-axis intervals for the respective offsets of the Y axis (S840).

In an embodiment, the interval change value acquisition unit 233 may pre-store initial interval values of the Y-axis intervals for the respective offsets of the X axis and initial interval values of the X-axis intervals for the respective offsets of the Y axis. The initial interval values of the Y-axis intervals for the respective offsets of the X axis and the initial interval values of the X-axis intervals for the respective offsets of the Y axis may be acquired based on initial eye diagram information corresponding to an initial data signal transmitted from the electronic device 100 prior to the data signal. The interval change value acquisition unit 233 may acquire, as each of the interval change values of the Y-axis intervals for the respective offsets of the X axis, a difference between the interval value and the initial interval value of the Y-axis interval for a corresponding offset of the X axis, and acquire, as each of the interval change values of the X-axis intervals for the respective offsets of the Y axis, a difference between the interval value and the initial interval value of the X-axis interval for a corresponding offset of the Y axis.

In an embodiment, the eye margin value acquisition unit 235 may acquire, as an eye margin value, a sum of the interval change values of the Y-axis intervals for the respective offsets of the X axis and the X-axis intervals for the respective offsets of the Y axis (S850).

The eye margin value comparator 237 may determine whether the eye margin value exceeds a reference value (S860).

In an embodiment, when the eye margin value is equal to or less than the reference value (S860, No), the eye margin value comparator 237 may control the communication interface 220 to transmit the pass information. The communication interface 220 may transmit the pass information to the electronic device 100 under the control of the eye margin value comparator 237 (S890). When the electronic device 100 receives the pass information (S891), the electronic device 100 may end the operation.

In an embodiment, when the eye margin value exceeds the reference value (S860, Yes), the shifter 239 may control the signal processing characteristic value (S870). Also, the shifter 239 may control the communication interface 210 to transmit fail information to the electronic device 100 (S880). When the communication interface 110 of the electronic device 100 receives the fail information (S881), the communication interface 110 may transmit the data signal to the memory system 200 in response to the fail information (S810). The communication interface 210 of the memory system 200 may newly receive a data signal from the electronic device 100 (S820), and adjust the data signal, based on the controlled signal processing characteristic value. The eye diagram processor 220 may acquire new eye diagram information corresponding to the adjusted data signal (S821). The signal processing controller 230 may compare a new signal margin value acquired through the new eye diagram information with the setting value (S830), and repeatedly perform the operation according to a flow until the new signal margin value exceeds the setting value within a predetermined maximum number limit. In an embodiment, the shifter 239 may differently apply a number of times the fail information is transmitted to the electronic device 100 according to a mode set from a first mode and a second mode. The first mode may be a simple mode and the second mode may be a precise mode.

Figure 9:
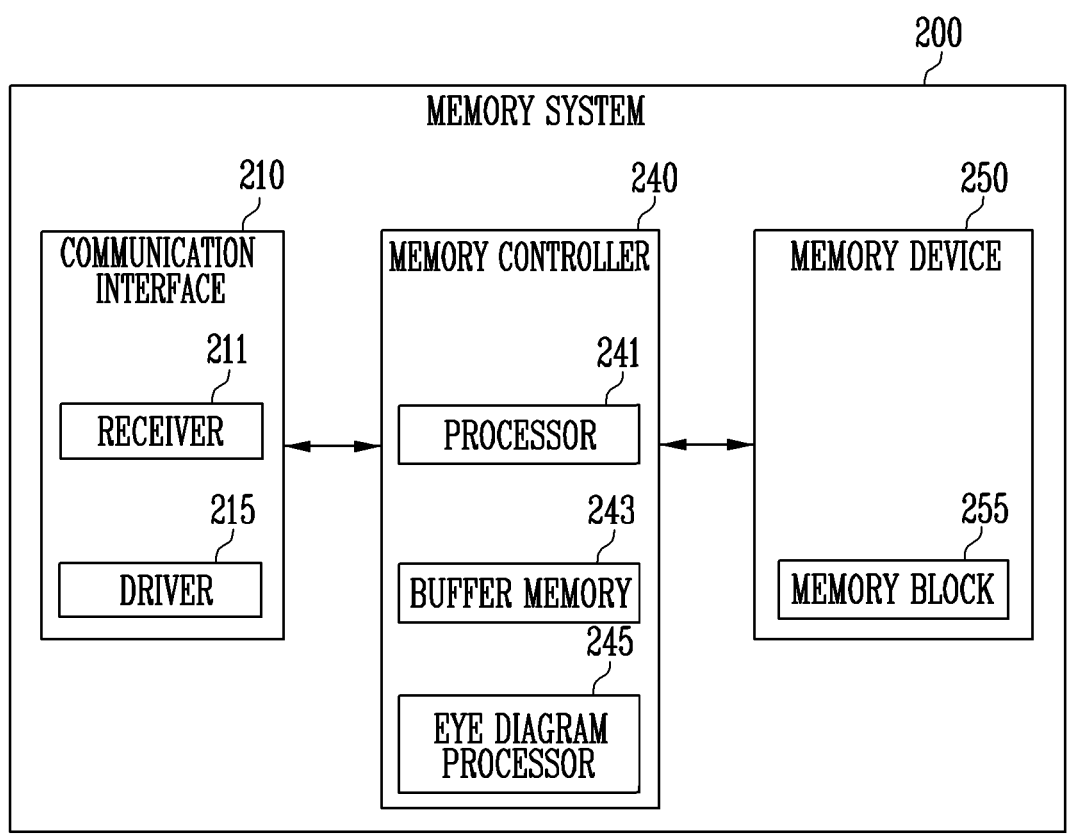
FIG. 9 is a diagram illustrating a memory system in accordance with an embodiment of the present disclosure.

FIG. 9 is a diagram illustrating a memory system in accordance with an embodiment of the present disclosure.

Referring to FIG. 9, the memory system 200 in accordance with the embodiment of the present disclosure may include a communication interface 210, a memory controller 240, and a memory device 250. The descriptions illustrated in FIGS. 1 and 7 may be applied to those of each of the communication interface 210 and an eye diagram processor 245, and overlapping descriptions will be omitted.

The memory controller 240 may control an operation of the memory device 250. The memory device 250 may store data or output stored data under the control of the memory controller 240.

In an embodiment, the memory controller 240 may include a processor 241, a buffer memory 243, and the eye diagram processor 245. The processor 241 may generate a command according to a request of the electronic device 100, and control a time at which the command is output. The command may include at least one of a write command for storing data, a read command for reading data, and an erase command for erasing data. The processor 241 may be implemented as a central processing unit (CPU), a microprocessor unit (MCU), an application processor (AP), or the like. The buffer memory 243 may store mapping information between a logical address and a physical address. The buffer memory 243 may temporarily store data transmitted/received between the communication interface 210 and the memory device 250. The buffer memory 243 may be implemented as an SRAM, a DRAM, or the like.

The memory device 250 may include a memory block 255. The memory block 255 may include a plurality of memory cells. The memory cell may be implemented as a semiconductor element. One memory cell may store one or more bits according to a Single Level Cell (SLC) method, a Multi-Level Cell (MLC) method, a Triple Level Cell (TLC) method, or the like.

In accordance with the present disclosure, there can be provided a memory system, an electronic system, and an operating method thereof, which can detect a characteristic change in signal and transmit/receive a signal without distortion.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Moreover, the embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. A memory system comprising:
   a communication interface configured to receive a data signal from an electronic device, and adjust the data signal based on a signal processing characteristic value;
   an eye diagram processor configured to acquire eye diagram information corresponding to the adjusted data signal; and
   a signal processing controller configured to control the signal processing characteristic value based on an interval change value of the eye diagram information,
   wherein the eye diagram information includes a plurality of error count values corresponding to each of an X axis and a Y axis, which are divided using a plurality of offsets,
   wherein the signal processing controller controls the signal processing characteristic value by:
   acquiring, for each of the offsets of the X axis, an interval value of a Y-axis interval in which each of the error count values is equal to or less than a reference count value, and
   acquiring, for each of the offsets of the Y axis, an interval value of an X-axis interval in which each of the error count values is equal to or less than the reference count value.

2. The memory system of claim 1,
   wherein the interval value of the X-axis interval for each of the offsets of the Y axis is an average value of a minimum offset and a maximum offset included in the X-axis interval for each of the offsets of the Y axis, and
   wherein the interval value of the Y-axis interval for each of the offsets of the X axis is an average value of a minimum offset and a maximum offset included in the Y-axis interval for each of the offsets of the X axis.

3. The memory system of claim 1, wherein the eye diagram processor is further configured to adjust a number of the plurality of offsets based on at least one of a use time of the memory system and a number of times an abnormal voltage is generated.

4. The memory system of claim 1, wherein the signal processing controller controls the signal processing characteristic value further by:
   determining whether a selected interval value among the interval values of the Y-axis intervals for the respective offsets of the X axis and the interval values of the X-axis intervals for the respective offsets of the Y axis is equal to or less than a setting value, and
   acquiring, when the selected interval value is equal to or less than the setting value, interval change values of the Y-axis intervals for the respective offsets of the X axis and the X-axis intervals for the respective offsets of the Y axis.

5. The memory system of claim 4, wherein the signal processing controller acquires the interval change values by:
    storing initial interval values of the Y-axis intervals for the respective offsets of the X axis and initial interval values of the X-axis intervals for the respective offsets of the Y axis, the initial interval values being acquired based on initial eye diagram information corresponding to an initial data signal received prior to the data signals,
    acquiring, as each of the interval change values of the Y-axis intervals for the respective offsets of the X axis, a difference between the interval value and the initial interval value of the Y-axis interval for a corresponding offset of the X axis, and
    acquiring, as each of the interval change values of the X-axis intervals for the respective offsets of the Y axis, a difference between the interval value and the initial interval value of the X-axis interval for a corresponding offset of the Y axis.

6. The memory system of claim 4, wherein the signal processing controller controls the signal processing characteristic value further by:
    acquiring, as an eye margin value, a sum of the interval change values, and
    determining whether the eye margin value exceeds a reference value.

7. The memory system of claim 6,
    wherein the signal processing controller controls the signal processing characteristic value when the eye margin value exceeds the reference value,
    wherein the signal processing controller is further configured to control the communication interface to transmit fail information to the electronic device, and
    wherein the communication interface is further configured to:
    receive, from the electronic device, the data signal as a response to the fail information, and
    adjust the data signal based on the controlled signal processing characteristic value.

8. The memory system of claim 7, wherein the signal processing controller controls the communication interface to transmit the fail information different numbers of times at a maximum according to a mode set from among a first mode and a second mode.

9. The memory system of claim 1, wherein the signal processing characteristic value corresponds to one of an amplitude and a phase.

10. An electronic system comprising:
    an electronic device including a first communication interface configured to output a data signal when a predetermined event occurs; and
    a memory system including a second communication interface configured to receive the data signal from the first communication interface and an eye diagram processor configured to acquire eye diagram information corresponding to the data signal,
    wherein one of the electronic device and the memory system further includes a signal processing controller configured to control a signal processing characteristic value based on an interval change value of the eye diagram information,
    wherein one of the first and second communication interfaces is further configured to adjust the data signal based on the controlled signal processing characteristic value,
    wherein the eye diagram information includes a plurality of error count values corresponding to each of an X axis and a Y axis, which are divided using a plurality of offsets,
    wherein the signal processing controller controls the signal processing characteristic value by:
    acquiring, for each of the offsets of the X axis, an interval value of a Y-axis interval in which each of the error count values is equal to or less than a reference count value, and
    acquiring, for each of the offsets of the Y axis, an interval value of an X-axis interval in which each of the error count values is equal to or less than the reference count value.

11. The electronic system of claim 10,
    wherein the interval value of the X-axis interval for each of the offsets of the Y axis is an average value of a minimum offset and a maximum offset included in the X-axis interval for each of the offsets of the Y axis, and
    wherein the interval value of the Y-axis interval for each of the offsets of the X axis is an average value of a minimum offset and a maximum offset included in the Y-axis interval for each of the offsets of the X axis.

12. The electronic system of claim 10, wherein the signal processing controller controls the signal processing characteristic value further by:
    determining whether a selected interval value among the interval values of the Y-axis intervals for the respective offsets of the X axis and the interval values of the X-axis intervals for the respective offsets of the Y axis is equal to or less than a setting value, and
    acquiring, when the selected interval value is equal to or less than the setting value, interval change values of the Y-axis intervals for the respective offsets of the X axis and the X-axis intervals for the respective offsets of the Y axis.

13. The electronic system of claim 12, wherein the signal processing controller acquires the interval change values by:
    storing initial interval values of the Y-axis intervals for the respective offsets of the X axis and initial interval values of the X-axis intervals for the respective offsets of the Y axis, the initial interval values being acquired based on initial eye diagram information corresponding to an initial data signal received prior to the data signals,
    acquiring, as each of the interval change values of the Y-axis intervals for the respective offsets of the X axis, a difference between the interval value and the initial interval value of the Y-axis interval for a corresponding offset of the X axis, and
    acquiring, as each of the interval change values of the X-axis intervals for the respective offsets of the Y axis, a difference between the interval value and the initial interval value of the X-axis interval for a corresponding offset of the Y axis.

14. The electronic system of claim 12,
    wherein the signal processing controller controls the signal processing characteristic value further by acquiring, as an eye margin value, a sum of the interval change values, and
    wherein the signal processing controller controls the signal processing characteristic value when the eye margin value exceeds a reference value.

15. The electronic system of claim 10, wherein the signal processing characteristic value corresponds to one of an amplitude and a phase.

16. The electronic system of claim 10, wherein the predetermined event is update of at least one of an operating system and firmware.

17. A method of operating a memory system, the method comprising:
- receiving a data signal from an electronic device;
- adjusting the data signal based on a signal processing characteristic value;
- acquiring eye diagram information corresponding to the adjusted data signal, wherein the eye diagram includes a plurality of error count values corresponding to each of an X axis and a Y axis, which are divided using a plurality of offsets;
- acquiring, for each of the offsets of the X axis, an interval value of a Y-axis interval in which each of the error count values is equal to or less than a reference count value;
- acquiring, for each of the offsets of the Y axis, an interval value of an X-axis interval in which each of the error count values is equal to or less than the reference count value;
- acquiring, as an eye margin value, a sum of the interval change values; and
- controlling a signal processing characteristic value based on the eye margin value.

18. The method of claim 17, wherein the signal processing characteristic value corresponds to one of an amplitude and a phase.

* * * * *